Patented Apr. 2, 1935

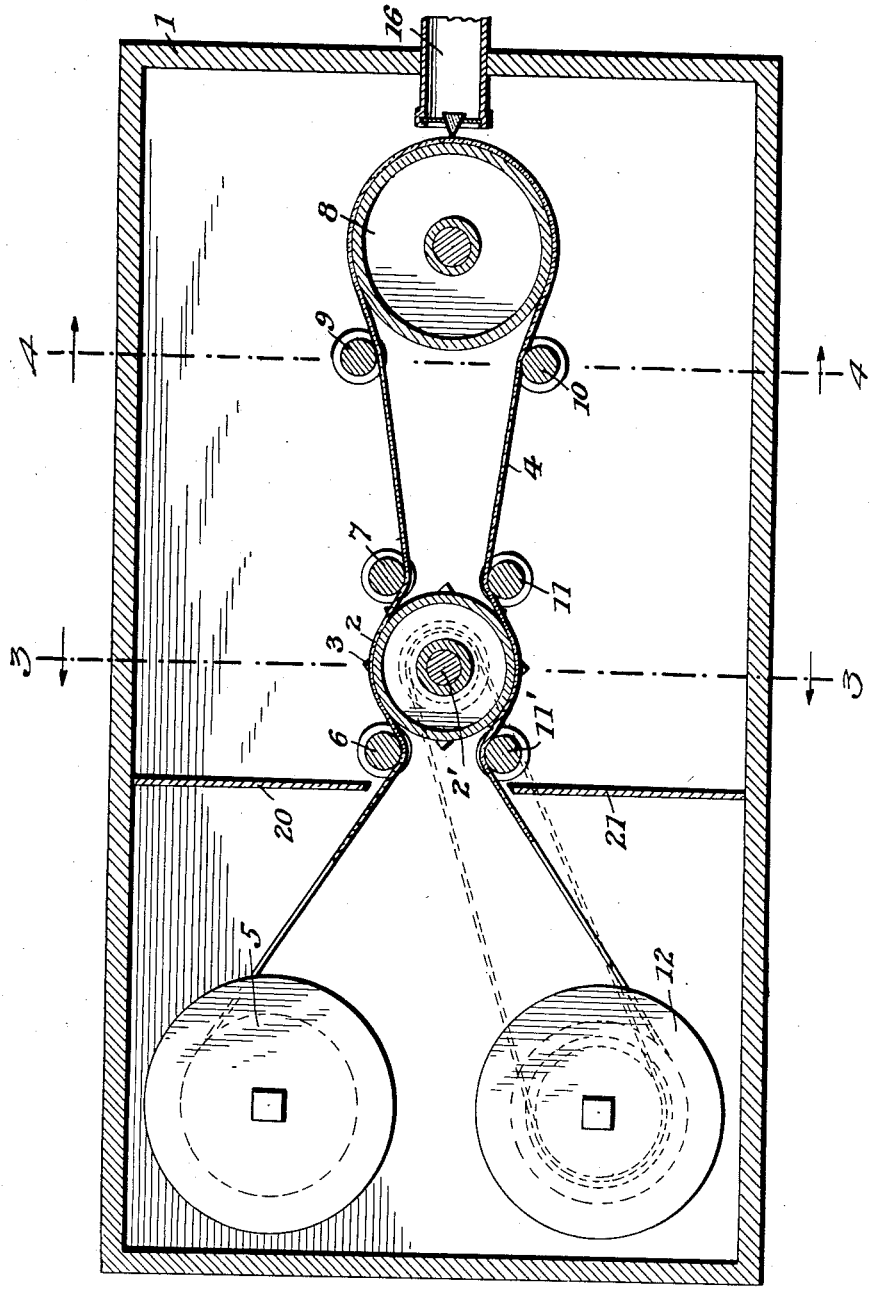

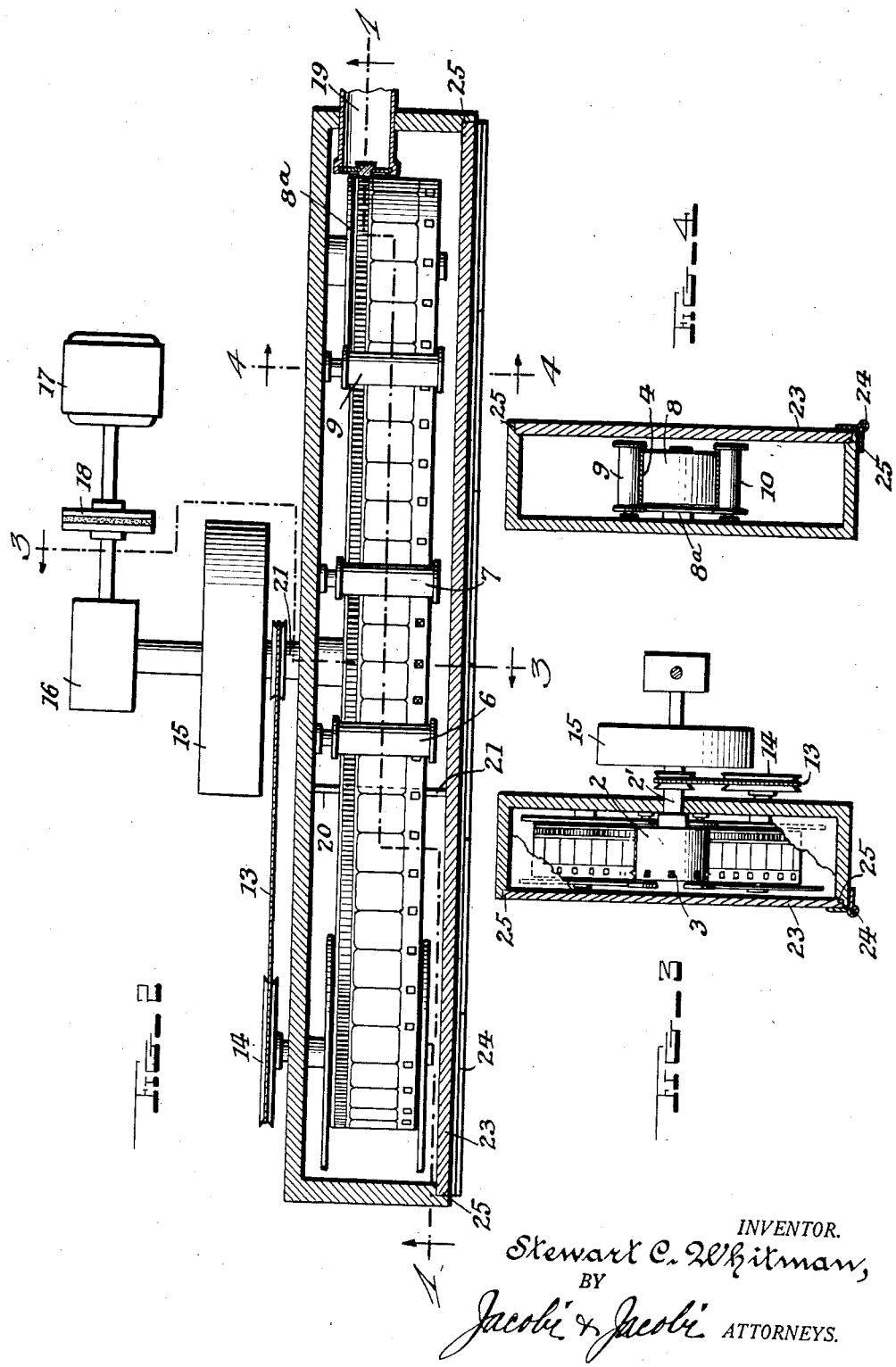

1,996,732

UNITED STATES PATENT OFFICE 1,996,732

SOUND RECORDING CAMERA

Stewart C. Whitman, New York, N. Y., assignor to Whitman Sound Systems, Ltd., Dover, Del., a corporation of Delaware Application September 19, 1932, Serial No. 633,910

11 Claims. (Cl. 179—100.3)

This invention relates to new and useful improvements in the art of recording sound on film and more particularly to a recording device to produce this result on narrow film, as for instance, the standard 16 millimeter size.

An object of this invention is to provide an apparatus for recording a relatively wide sound track on relatively narrow film.

Another object of this invention is to provide means for recording such a sound track without distorting the film.

A further object of the invention is to provide means for accurately positioning the sound track with respect to adjacent portions of the film.

Still another object of the invention resides in the provision for changing reels easily and quickly in daylight.

With these and numerous other objects in view, my invention consists in the novel features of construction, combination and arrangement of parts as will hereinafter be referred to and more particularly pointed out in the specification and claims.

In the drawings forming a part of this application:

Figure 1 is a vertical longitudinal section of an apparatus embodying my invention taken on the line 1—1 of Figure 2.

Figure 2 is a horizontal section through the device.

Figure 3 is a vertical transverse section taken on lines 3—3 of Figures 1 and 2.

Figure 4 is a vertical transverse section taken on line 4—4 of Figure 2.

The above elements and their various arrangements will be more particularly described in the disclosure which follows.

In my co-pending application Ser. No. 635,120, filed Sept. 27, 1932, I have described the manifold advantages of utilizing an abnormally wide sound track on 16 millimeter motion picture film. The actual recording of such a track was made possible in the preferred form by the elimination of the sprocket perforations along one edge of the film, thus allowing ample space for the wide sound track without diminishing the size of picture. In practice, however, such a system introduces difficulties. The present invention describes a recording apparatus by the use of which these difficulties are eliminated.

In the recording camera designed according to my invention the driving sprocket is equipped with teeth on one side only. This drive sprocket is situated substantially in the center of the camera housing. All moving parts are positioned so that the line of film travel is as short and as straight as possible. This is important since the single sprocket drive tends to stretch the film along the driven edge. To facilitate this shortening and straightening, the loaded reel and the take-up reel are mounted inside the light-proof camera chamber.

This arrangement possesses another practical advantage in that the camera may be reloaded without precaution against light.

As noted above there is a probability of the film stretching along one edge due to the uneven driving torque introduced by the single sprocket line. Such a condition would render proper recording and reproduction impossible. In the present invention this condition is neutralized. Instead of the drive sprocket being a true cylinder it is machined to provide a steady increase in diameter from the toothed edge toward the opposite edge. This taper is very slight—the difference in diameter of the opposite faces being of the order of 0.003 inch—but is sufficient to afford firm support for the edge of the film opposite the sprocket line. A large idler pulley is provided following the drive sprocket around which the film travels. The film is held in firm frictional contact with the pulley and serves to drive it. The recording is accomplished while the film is passing around this pulley. Any stretching effect produced by the drive sprocket is further neutralized by this pulley. The pulley is flanged on the side opposite the sprocket line and slightly tapered wider toward the flanged face. This taper is a trifle more accentuated than in the case of the drive sprocket, being of the order of 0.005 inch. By providing this taper on the recording pulley another essential purpose is served. The edge of the film constantly rides against the inside face of the flange thus insuring an accurate positioning of the sound track at all times during recording.

Referring to the drawings, in which similar reference characters designate corresponding parts throughout the several views, the numeral 1 designates a light-proof camera housing substantially in the form of an elongated, narrow rectangular box. Arranged centrally within the housing 1 is a driving sprocket 2, carried on a shaft 2' which extends transversely of said camera box, said sprocket being provided with teeth 3 along one edge only, as clearly shown in Figure 3 of the drawings. The film 4 is adapted to be unwound from the loaded reel 5 and passes over the drive sprocket 2, said film being provided with a single row of sprocket openings for engagement with the teeth 3, as also clearly shown in Figures 2 and 3 of the drawings. The film is held in contact with the drive sprocket 2 through the medium of the retaining rollers 6 and 7, which are of the usual construction yieldingly and adjustably held in position (the supporting means for said rollers not being illustrated).

As the film leaves the drive sprocket 2, the same passes around the recording pulley 8 which pulley has provided at its one end the peripheral flange 8a and said film is held in frictional contact with said pulley through the medium of the take-up rollers 9 and 10. The film, after passing over the pulley 8 is conducted in contact with the lower portion of the sprocket 2 being held in contact therewith by means of the retaining rollers 11 and 11', as clearly shown in Figure 1 of the drawings, and from this point the film is conducted to the take-up reel 12, which reel, together with the leading reel 5 is entirely housed within the camera box, as also clearly illustrated in Figure 1.

The take-up reel 12 is driven from the sprocket shaft 2' by means of the spring belt 13, and pulley 14, as best illustrated in Figure 2. This spring belt retains sufficient tension on the take-up reel to insure tight, even winding of the film.

Mounted on the shaft 2' is the fly wheel 15 forming a mechanical filter, the shaft receiving its power from the reduction gears generally designated by the numeral 16. The gears 16 connect with a synchronous motor 17 through the medium of a shaft and flexible coupling 18.

At one end of the camera box is disclosed (Figures 1 and 2) the recording lamp 19 which may be of any preferred construction but, as illustrated, is of a type as illustrated in my co-pending application filed of an even date herewith, Ser. No. 633,911.

In order to protect the unexposed film as it leaves the reel 5 from any stray light from the recording lamp, I provide in the camera box 1 the partitions 20 and 21 which are best illustrated in Figures 1 and 2 of the drawings.

A door 23 is provided for the camera box which fits snugly into the L-shaped groove 25 and is mounted on the hinge 24 which extends the full length of the camera box 1. This particular construction with the arrangement of the reels as shown herein permits of daylight loading of the camera.

As stated above, in order to prevent stretching or distortion of the film, which might be induced by the driving torque caused by the single sprocket line, the sprocket 2 is tapered slightly larger toward the end opposite that having the teeth 3 thereon. This taper is .003 of an inch, as previously indicated.

As also previously stated, any stretching produced by the drive sprocket is further neutralized by the flanging of the pulley 8 and the slight tapering of the pulley wider toward the flanged end thereof, the taper being .005 of an inch. Thus the edge of the film constantly rides against the inside face of the flange 8a and accurate positioning of the sound track during recording is assured. It will also be noted that the recording pulley 8 is substantially larger than the drive sprocket 2. Due to the size and mass of this pulley considerable filtering action is obtained in the passage of the film thereover.

From the foregoing description of the construction of my improved camera, the operation thereof will be readily understood and it will be seen that I have provided a simple and efficient means for carrying out the objects of the invention.

While I have particularly described the elements best adapted to perform the functions set forth, various changes in form, proportion and in the minor details of construction may be resorted to without departing from the spirit or sacrificing any of the principles of the invention.

Having thus described the invention, what is claimed is:

1. In a sound recording camera, a housing, a recording light therein, a film in said housing, said film being provided with sprocket perforations on one edge only, an idler recording pulley positioned adjacent said recording light so that said film is exposed to said recording light while passing over said recording pulley, a separate rotatable driving member provided with sprocket teeth at only one end thereof to engage the perforations on the edge of said film, said driving member having a rotatable surface as broad as said film and being tapered to a smaller diameter on the end provided with sprocket teeth, said film being trained over said tapered driving member and said pulley for movement through said camera without side play.

2. In a recording camera, a housing, a sound recording light therein, a film in said housing, said film being provided with sprocket perforations on one edge only, a recording idler pulley positioned adjacent said recording light so that said film is exposed to said recording light while passing over said recording pulley, a separate rotatable driving member provided with sprocket teeth at only one end thereof to engage the perforations on the edge of said film, said driving member having a rotatable surface as broad as said film and tapered to a smaller diameter on the end provided with sprocket teeth, said film in the course of movement passing first over one side of said driving member in engagement therewith, then over said pulley, and then over the other side of said driving member in engagement therewith, for movement through said camera without side play.

3. In a recording camera, a housing, a sound recording light at one end of said housing, an idler recording pulley positioned within said housing, in close proximity to said light so that said film is exposed to said recording light while passing over said recording pulley, a loading reel and a take-off reel rotatably mounted within said housing at the end opposite to said recording light, a film provided with sprocket perforations on one edge only, a separate rotatable driving member centrally disposed within said housing, said driving member being provided with sprocket teeth at only one end thereof to engage the perforations on said film, said driving member having a rotatable surface as broad as said film and being tapered to a smaller diameter on the end provided with sprocket teeth, said film being trained to pass from said loading reel over one side of said driving member, thence over said pulley and before said recording light, thence over the other side of said driving member, thence to said take-off reel, for movement through said camera without side-play.

4. In a recording camera, a housing, a recording light therein, a film in said housing provided with sprocket perforations on one edge only and with a sound track on the other edge, an idler recording pulley positioned adjacent said recording light so that said film is exposed to said recording light while passing over said recording pulley, a separate rotatable driving member provided with sprocket teeth at only one end thereof to engage the perforations on the edge of said film, said driving member having a rotatable surface as broad as said film and being tapered to a smaller diameter on the end provided with sprocket teeth, said film in the course of movement passing first over one side of said driving member in engagement therewith, then over said pulley, exposing said sound track to said recording light, and then over the other side of said driving member in engagement therewith, for movement through said camera without sideplay.

5. In a sound recording camera, a housing, a recording light in said housing, a film in said housing having a single line of sprocket perforations, means for supporting said film while it passes before and is exposed to said recording light, and separate means for positively engaging and feeding said film before said recording light comprising a sprocket having a single line of teeth at one edge thereof which engage said sprocket perforations in said film and drive said film, said sprocket being tapered smaller toward its toothed edge.

6. In a sound recording camera, a housing, a recording light in said housing, a film in said housing perforated along one edge only, a recording pulley positioned for supporting said film while it passes before and is exposed to said recording light, and separate means for positively engaging and feeding said film before said recording light comprising a sprocket having a single line of teeth at one edge thereof which engage said sprocket perforations in said film and drive said film, said sprocket being tapered smaller toward its toothed edge.

7. In a sound recording camera, a housing, a recording light in said housing, a film in said housing, a recording pulley positioned for supporting said film while it passes before and is exposed to said recording light, said recording pulley being provided with a lateral flange on one edge and being tapered larger toward said flanged edge, and separate means for feeding said film before said recording light comprising a sprocket having a single line of teeth at one edge thereof, said sprocket being tapered smaller toward its toothed edge.

8. In a sound recording camera, a housing, a recording light in said housing, a loading reel and a take-off reel mounted in said housing, a film in said housing, means for supporting said film while it passes before and is exposed to said recording light, and separate means for feeding said film before said recording light comprising a sprocket having a single line of teeth at one edge thereof, said sprocket being tapered smaller toward its toothed edge, said reels, said supporting means and said feeding means being so positioned in said housing that said film at all times extends in a substantially longitudinal direction within said housing.

9. In a sound recording camera, a housing, a recording light in said housing, a recording pulley positioned for supporting said film while it passes before and is exposed to said recording light, a separate sprocket for driving said film and provided with a single line of teeth at one edge thereof, said sprocket being tapered smaller towards its toothed edge, said recording pulley being tapered of a greater order than the taper of said sprocket.

10. In a sound recording camera, a housing, a recording light in said housing, a recording pulley positioned for supporting said film while it passes before and is exposed to said recording light, a separate sprocket for driving said film and provided with a single line of teeth at one edge thereof, said sprocket being tapered smaller toward its toothed edge, said recording pulley being of a diameter greater than the diameter of said sprocket and being tapered of a greater order than the taper of said sprocket.

11. In a sound recording camera, a housing, a recording light in said housing, a recording pulley positioned for supporting said film while it passes before and is exposed to said recording light, a separate sprocket for driving said film and provided with a single line of teeth at one edge thereof, said sprocket being tapered smaller toward its toothed edge, said recording pulley being tapered of a greater order than the taper of said sprocket in the same direction as the taper of said sprocket.

STEWART C. WHITMAN.